(12) United States Patent
Huddleston et al.

(10) Patent No.: US 12,428,527 B2
(45) Date of Patent: *Sep. 30, 2025

(54) PROCESS FOR FORMING PARTICLES

(71) Applicant: The Procter & Gamble Company, Cincinnati, OH (US)

(72) Inventors: Richard Albert Huddleston, Cincinnati, OH (US); Ke Ming Quan, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 628 days.

This patent is subject to a terminal disclaimer.

(21) Appl. No.: 17/831,812

(22) Filed: Jun. 3, 2022

(65) Prior Publication Data
US 2023/0391964 A1    Dec. 7, 2023

(51) Int. Cl.
| C08J 3/12 | (2006.01) |
| C08J 9/12 | (2006.01) |
| C11D 17/06 | (2006.01) |

(52) U.S. Cl.
CPC .......... C08J 3/12 (2013.01); C08J 9/122 (2013.01); C11D 17/06 (2013.01); C08J 2329/04 (2013.01); C08J 2353/00 (2013.01)

(58) Field of Classification Search
CPC ....... B29B 9/16; B29B 9/02; B29B 2009/161; B29B 13/00; B29K 2096/04
See application file for complete search history.

(56) References Cited

U.S. PATENT DOCUMENTS

| 6,136,891 A * | 10/2000 | Chopin .................. B01J 13/02 428/407 |
| 10,301,579 B2 | 5/2019 | Dykstra et al. |
| 10,471,629 B2 | 11/2019 | Huddleston et al. |
| 11,186,803 B2 | 11/2021 | Corona, III et al. |
| 11,193,091 B2 | 12/2021 | Corona, III et al. |
| 11,708,545 B2 | 7/2023 | Corona, III et al. |
| 2016/0368169 A1 | 12/2016 | Huddleston et al. |
| 2017/0114304 A1 | 4/2017 | Miracle |
| 2022/0049188 A1 | 2/2022 | Corona, III et al. |

OTHER PUBLICATIONS

16287 PCT Search Report and Written Opinion for PCT/US2023/024238 dated Sep. 28, 2023, 10 pages.

* cited by examiner

*Primary Examiner* — Alison L Hindenlang
*Assistant Examiner* — Shibin Liang
(74) *Attorney, Agent, or Firm* — Carolyn S. Powell; Gary J. Foose

(57) ABSTRACT

A process for forming particles. The process includes a step of entraining gas into a precursor material, wherein the gas includes from about 50 vol % to about 100 vol % argon and from about 0 vol % to about 50 vol % other constituents. The precursor material is deposited onto a moving conveyor. The precursor material is cooled to form a plurality of particles.

20 Claims, 4 Drawing Sheets

PROCESS FOR FORMING PARTICLES

FIELD OF THE INVENTION

Process for forming particles.

BACKGROUND OF THE INVENTION

Consumers desire products that can simplify the processes they use to do their laundry, help them reduce the amount of time that they spend dealing with soiled laundry, and help them achieve high levels of benefits. Consumers are well positioned to understand the amount of fabric care composition that is required to provide benefit they desire. As a result, fabric care products that enable consumers to customize the amount of fabric care composition they use are popular with many consumers.

Fabric care products that can be delivered in the wash are particularly easy for consumers to use. For instance, the consumer can simply place the fabric care product in the tub of the washing machine along with the laundry and start the washing machine cycle.

Typically, consumers use a fabric care detergent composition that contains an appreciable quantity of surfactants and other cleaning ingredients. Such fabric care compositions are often provided in soluble unit dose pouches that contain a prescribed quantity of fabric care active agents. Fabric care compositions are also provided in liquid or powder forms and the consumer is provided with a measuring cup to provide a measured quantity of fabric care composition. These types of products may be referred to as fully formulated fabric care compositions.

To provide for fabric care benefits above and beyond what can be provided by using fully formulated fabric care compositions, fabric care products that are additives are popular with consumers. Consumers enjoy and are satisfied by using fabric care additives that are packaged in a manner the enables the consumer to use a custom amount of the fabric care additive based on the consumer's judgment of how much of the fabric care additive is needed to provide the desired benefit. Such fabric care additives are conveniently provided through the wash along with fully formulated fabric care compositions but are dosed separately from the fully formulated fabric care composition.

Fabric care additives in the form of particles have become attractive to many consumers. Some fabric care additive particles are provided with a porous structure. Particles having a porous structure can float in the water as the wash liquor is formed. Particles that float may tend to dissolve more completely in the wash as compared to particles that sink because particles that sink may become trapped in folds, creases, and pockets of the laundry during washing. Undissolved particles tend to incompletely deliver the fabric care benefit active agent contained in the particle, which may be undesirable to the consumer. Particles that float and include unencapsulated perfume may provide a pleasant scent to the headspace above the wash liquor and the room within which the washing machine is positioned. Further, particles that float may better distribute the fabric care additives to the laundry during the wash cycle.

Melt processing is a common approach for forming particles. One problem with making porous particles via a melt process is that the bubbles within the melt tend to coalesce and rise out of the molten material as the melted precursor material solidifies. This can result in large pores at or near an outer surface of the particle, an irregular rough outer surface, an irregular distribution of pore sizes within solidified particles, and eruptions of bubbles and molten material from the surface of the particle as it solidifies. Such particles may be less durable that particles that have a more competent outer surface and be prone to becoming dusty, messy to use, and appear to be of poor quality. The tendency of bubble within the melt to coalesce and rise out of the molten material as the melted precursor material solidifies can also effectively limit the volume of pores that can be provided in particles without these adverse consequences occurring.

With these limitations in mind, there is a continuing unaddressed need for fabric care additives in the form of particles that have a uniform distribution of pore sizes throughout the particle. There is a further unaddressed need for a process for forming such porous particles.

SUMMARY OF THE INVENTION

A process for forming particles comprising the steps of: providing a precursor material to a feed pipe; entraining gas into said precursor material, wherein said gas comprises from about vol % to about 100 vol % argon and from about 0 vol % to about 100 vol % other constituents; providing a distributor comprising a plurality of apertures; transporting said precursor material from said feed pipe to said distributor; passing said precursor material through said apertures; providing a moveable conveyor beneath said apertures; depositing said precursor material onto said moveable conveyor; and cooling said precursor material to form a plurality of particles.

DETAILED DESCRIPTION OF THE INVENTION

Water Soluble Carrier

Figure 1:
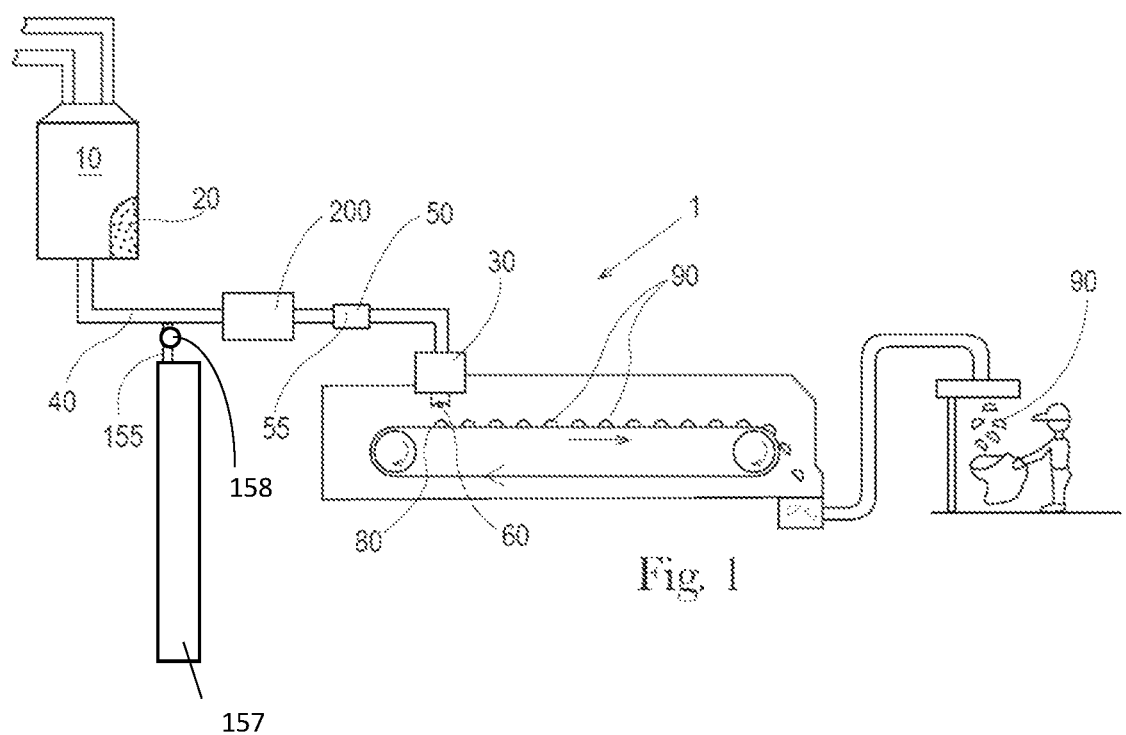
FIG. 1 is an apparatus for forming particles.

The particles, and thus precursor material as described below, can comprise a water soluble carrier. The water soluble carrier can be a water soluble polymer. The water soluble carrier acts to carry the capsules to the wash liquor. Upon dissolution of the water soluble carrier, the capsules are dispersed into the wash liquor and deposited onto the laundry.

The water soluble carrier can be a material that is soluble in a wash liquor within a short period of time, for instance less than about 10 minutes.

Water soluble means that the material, carrier material, or particle is soluble or dispersible in water, and optionally has a water-solubility of at least 50%, optionally at least 75% or even at least 95%, as measured by the method set out hereafter using a glass-filter with a maximum pore size of 20 microns: 50 grams±0.1 gram of the carrier is added in a pre-weighed 400 mL beaker and 245 mL±1 mL of distilled water is added. This is stirred vigorously on a magnetic stirrer set at 600 rpm, for 30 minutes. Then, the mixture is filtered through a sintered-glass filter with a pore size as defined above (max. 20 micron). The steps are performed at a temperature of 23° C.±1.0° C. and a relative humidity of 50%±2%. The water is dried off from the collected filtrate by any conventional method, and the weight of the remaining material is determined (which is the dissolved or dispersed fraction). Then, the percentage solubility or dispersibility can be calculated.

The water soluble carrier can be selected from the group consisting of water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof.

Alkali metal salts can be, for example, selected from the group consisting of salts of lithium, salts of sodium, and salts of potassium, and any combination thereof. Useful alkali metal salts can be, for example, selected from the group consisting of alkali metal fluorides, alkali metal chlorides, alkali metal bromides, alkali metal iodides, alkali metal sulfates, alkali metal bisulfates, alkali metal phosphates, alkali metal monohydrogen phosphates, alkali metal dihydrogen phosphates, alkali metal carbonates, alkali metal monohydrogen carbonates, alkali metal acetates, alkali metal citrates, alkali metal lactates, alkali metal pyruvates, alkali metal silicates, alkali metal ascorbates, and combinations thereof.

Alkali metal salts can be selected from the group consisting of sodium fluoride, sodium chloride, sodium bromide, sodium iodide, sodium sulfate, sodium bisulfate, sodium phosphate, sodium monohydrogen phosphate, sodium dihydrogen phosphate, sodium carbonate, sodium hydrogen carbonate, sodium acetate, sodium citrate, sodium lactate, sodium tartrate, sodium silicate, sodium ascorbate, potassium fluoride, potassium chloride, potassium bromide, potassium iodide, potassium sulfate, potassium bisulfate, potassium phosphate, potassium monohydrogen phosphate, potassium dihydrogen phosphate, potassium carbonate, potassium monohydrogen carbonate, potassium acetate, potassium citrate, potassium lactate, potassium tartrate, potassium silicate, potassium, ascorbate, and combinations thereof.

Alkaline earth metal salts can be selected from the group consisting of salts of magnesium, salts of calcium, and the like, and combinations thereof. Alkaline earth metal salts can be selected from the group consisting of alkaline metal fluorides, alkaline metal chlorides, alkaline metal bromides, alkaline metal iodides, alkaline metal sulfates, alkaline metal bisulfates, alkaline metal phosphates, alkaline metal monohydrogen phosphates, alkaline metal dihydrogen phosphates, alkaline metal carbonates, alkaline metal monohydrogen carbonates, alkaline metal acetates, alkaline metal citrates, alkaline metal lactates, alkaline metal pyruvates, alkaline metal silicates, alkaline metal ascorbates, and combinations thereof. Alkaline earth metal salts can be selected from the group consisting of magnesium fluoride, magnesium chloride, magnesium bromide, magnesium iodide, magnesium sulfate, magnesium phosphate, magnesium monohydrogen phosphate, magnesium dihydrogen phosphate, magnesium carbonate, magnesium monohydrogen carbonate, magnesium acetate, magnesium citrate, magnesium lactate, magnesium tartrate, magnesium silicate, magnesium ascorbate, calcium fluoride, calcium chloride, calcium bromide, calcium iodide, calcium sulfate, calcium phosphate, calcium monohydrogen phosphate, calcium dihydrogen phosphate, calcium carbonate, calcium monohydrogen carbonate, calcium acetate, calcium citrate, calcium lactate, calcium tartrate, calcium silicate, calcium ascorbate, and combinations thereof.

Inorganic salts, such as inorganic alkali metal salts and inorganic alkaline earth metal salts, do not contain carbon. Organic salts, such as organic alkali metal salts and organic alkaline earth metal salts, contain carbon. The organic salt can be an alkali metal salt or an alkaline earth metal salt of sorbic acid (i.e., a sorbate). Sorbates can be selected from the group consisting of sodium sorbate, potassium sorbate, magnesium sorbate, calcium sorbate, and combinations thereof.

The water soluble carrier can be or comprise a material selected from the group consisting of a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, and combinations thereof. The water soluble carrier can be selected from the group consisting of sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate, water glass, sodium silicate, potassium silicate, dextrose, fructose, galactose, isoglucose, glucose, sucrose, raffinose, isomalt, xylitol, candy sugar, coarse sugar, and combinations thereof. In one embodiment, the water soluble carrier can be sodium chloride. In one embodiment, the water soluble carrier can be table salt.

The water soluble carrier can be or comprise a material selected from the group consisting of sodium bicarbonate, sodium sulfate, sodium carbonate, sodium formate, calcium formate, sodium chloride, sucrose, maltodextrin, corn syrup solids, corn starch, wheat starch, rice starch, potato starch, tapioca starch, clay, silicate, citric acid carboxymethyl cellulose, fatty acid, fatty alcohol, glyceryl diester of hydrogenated tallow, glycerol, and combinations thereof.

The water soluble carrier can be selected from the group consisting of water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, and combinations thereof.

The water soluble carrier can be selected from the group consisting of disaccharides, polysaccharides, silicates, zeolites, carbonates, sulfates, citrates, and combinations thereof.

The water soluble carrier can be selected from the group consisting of polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof.

The water soluble carrier can be a water soluble polymer. The water soluble polymer can be selected from the group consisting of C8-C22 alkyl polyalkoxylate comprising more than about 40 alkoxylate units, ethoxylated nonionic surfactant having a degree of ethoxylation greater than about 30, polyalkylene glycol having a weight average molecular weight from about 2000 to about 15000, and combinations thereof.

The water soluble polymer can be a block copolymer having Formulae (I), (II), (III) or (IV), $R^1O\text{-}(EO)x\text{-}(PO)y\text{-}R^2$ (I), $R^1O\text{—}(PO)x\text{-}(EO)y\text{-}R^2$ (II), $R^1O\text{-}(EO)o\text{-}(PO)p\text{-}(EO)q\text{-}R^2$ (III), $R^1O\text{—}(PO)o\text{-}(EO)p\text{-}(PO)q\text{-}R^2$ (IV), or a combination thereof; wherein EO is a —$CH_2CH_2O$— group, and PO is a —$CH(CH_3)CH_2O$— group; $R^1$ and $R^2$ independently is H or a C1-C22 alkyl group; x, y, o, p, and q independently is 1-100; provided that the sum of x and y is greater than and the sum of o, p and q is greater than 35; wherein the block copolymer has a molecular weight ranging from about 3000 g/mol to about 15,000 g/mol.

The water soluble polymer can be a block copolymer or block copolymers, for example a block copolymer based on ethylene oxide and propylene oxide selected from the group consisting of PLURONIC-F38, PLURONIC-F68, PLURONIC-F77, PLURONIC-F87, PLURONIC-F88, and combinations thereof. PLURONIC materials are available from BASF.

The water soluble polymer can be selected from the group consisting of polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; polyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof. In one embodiment the polymer comprises polyacrylates, especially sulfonated polyacrylates and water-soluble acrylate copolymers; and alkylhydroxy cellulosics such as methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates. In yet another embodiment the water soluble polymer can be selected from the group consisting of PVA; PVA copolymers; hydroxypropyl methyl cellulose (HPMC); and mixtures thereof.

The water soluble polymer can be selected from the group consisting of polyvinyl alcohol, modified polyvinyl alcohol, polyvinyl pyrrolidone, polyvinyl alcohol/polyvinyl pyrrolidone, polyvinyl alcohol/polyvinyl amine, partially hydrolyzed polyvinyl acetate, polyalkylene oxide, polyethylene glycol, acrylamide, acrylic acid, cellulose, alkyl cellulosics, methyl cellulose, ethyl cellulose, propyl cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides, starch, modified starch, gelatin, alginates, xyloglucans, hemicellulosic polysaccharides, xylan, glucuronoxylan, arabinoxylan, mannan, glucomannan, galactoglucomannan, natural gums, pectin, xanthan, carrageenan, locus bean, arabic, tragacanth, polyacrylates, sulfonated polyacrylates, water-soluble acrylate copolymers, alkylhydroxy cellulosics, methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates, polyvinyl alcohol copolymers, hydroxypropyl methyl cellulose, and mixtures thereof.

The water soluble polymer can be an organic material. Organic water soluble polymers may provide a benefit of being readily soluble in water.

The water soluble polymer can be selected from the group consisting of polyethylene glycol, polypropylene glycol polyoxoalkylene, polyethylene glycol fatty acid ester, polyethylene glycol ether, starch, and mixtures thereof.

The water soluble polymer can be polyethylene glycol (PEG). PEG can be a convenient material to employ to make particles because it can be sufficiently water soluble to dissolve during a wash cycle when the particles have the range of mass disclosed herein. Further, PEG can be easily processed as melt. The onset of melt temperature of PEG can vary as a function of molecular weight of the PEG. The particles can comprise about 20% to about 94% by weight PEG having a weight average molecular weight from about 2000 to about 15000. PEG has a relatively low cost, may be formed into many different shapes and sizes, minimizes unencapsulated perfume diffusion, and dissolves well in water. PEG comes in various weight average molecular weights. A suitable weight average molecular weight range of PEG includes from about 2,000 to about 13,000, alternatively from about 4,000 to about 13,000, alternatively from about 4,000 to about 12,000, alternatively from about 4,000 to about 11,000, alternatively from about 5,000 to about 11,000, alternatively from about 6,000 to about 10,000, alternatively from about 7,000 to about 9,000, alternatively combinations thereof. PEG is available from BASF, for example PLURIOL E 8000, or other PLURIOL product. The water soluble polymer can be a mixture of two or more polyethylene glycol compositions, one having a first weight average molecular weight (e.g. 9000) and the other having a second weight average molecular weight (e.g. 4000), the second weight average molecular weight differing from the first weight average molecular weight.

The particles can comprise about 20% to about 99% by weight water soluble carrier. The particles can comprise from about 35% to about 95%, optionally from about 50% to about 80%, optionally combinations thereof and any whole percentages or ranges of whole percentages within any of the aforementioned ranges, of water soluble carrier by weight of the particles.

The plurality of particles can comprise individual particles that comprise about 20% to about 99% by weight of the particles water soluble carrier; and about 0.1% to about 20% by weight of the particles capsules; wherein the capsules are dispersed in a matrix of the water soluble polymer.

The particles can comprise about 20% to about 99% by weight of the individual particles of PEG. Optionally, the individual particles can comprise from about 20% to about 95%, optionally from about 35% to about 95%, optionally from about 50% to about 80%, optionally combinations thereof and any whole percentages or ranges of whole percentages within any of the aforementioned ranges, of PEG by weight of the particles.

The water soluble polymer can comprise a material selected from the group consisting of: a polyalkylene polymer of formula H—$(C_2H_4O)_x$—$(CH(CH_3)CH_2O)_y$—$(C_2H_4O)_z$—OH wherein x is from about 50 to about 300, y is from about 20 to about 100, and z is from about 10 to about 200; a polyethylene glycol fatty acid ester of formula $(C_2H_4O)_q$—C(O)O—$(CH_2)_r$—$CH_3$ wherein q is from about 20 to about 200 and r is from about 10 to about 30; a polyethylene glycol fatty alcohol ether of formula HO—$(C_2H_4O)_s$—$(CH_2)_t$—$CH_3$ wherein s is from about 30 to about 250 and t is from about 10 to about 30; and mixtures thereof. The polyalkylene polymer of formula H—$(C_2H_4O)_x$—$(CH(CH_3)CH_2O)_y$—$(C_2H_4O)_z$—OH wherein x is from about 50 to about 300, y is from about 20 to about 100, and z is from about 10 to about 200, can be a block copolymer or random copolymer.

The water soluble polymer can comprise: polyethylene glycol; a polyalkylene polymer of formula $H-(C_2H_4O)_x-(CH(CH_3)CH_2O)_y-(C_2H_4O)_z-OH$ wherein x is from about 50 to about 300; y is from about 20 to about 100, and z is from about 10 to about 200; a polyethylene glycol fatty acid ester of formula $(C_2H_4O)_q-C(O)O-(CH_2)_r-CH_3$ wherein q is from about 20 to about 200 and r is from about 10 to about 30; and a polyethylene glycol fatty alcohol ether of formula $HO-(C_2H_4O)_s-(CH_2)t-CH_3$ wherein s is from about 30 to about 250 and t is from about 10 to about 30.

The water soluble polymer can comprise from about 20% to about 95% by weight of the plurality of particles or by weight of the individual particles of polyalkylene polymer of formula $H-(C_2H_4O)_x-(CH(CH_3)CH_2O)_y-(C_2H_4O)_z-OH$ wherein x is from about 50 to about 300; y is from about 20 to about 100, and z is from about 10 to about 200.

The water soluble polymer can comprise from about 1% to about 20% by weight of the plurality of particles or by weight of the individual particles polyethylene glycol fatty acid ester of formula $(C_2H_4O)_q-C(O)O-(CH_2)_r13\ CH_3$ wherein q is from about 20 to about 200 and r is from about 10 to about 30.

The water soluble polymer can comprise from about 1% to about 10% by weight of the plurality of particles or by weight of the individual particles of polyethylene glycol fatty alcohol ether of formula $HO-(C_2H_4O)_s-(CH_2)_t-CH_3$ wherein s is from about 30 to about 250 and t is from about 10 to about 30.

The water soluble carrier can comprise plasticizer polyol (from 0% to 3% by weight of the particles), wherein the plasticizer polymer is optionally a liquid at 20 C and 1 atmosphere of pressure; water (from 1% to 20%, or 1% to 12%, or 6% to 8%, by weight of the particles); sugar alcohol polyol selected from the group consisting of erythritol, xylitol, mannitol, isomalt, maltitol, lactitol, trehalose, lactose, tagatose, sucralose, and mixtures thereof (from 45% to 80%, or 50% to 70%, or 50% to 60%, by weight of the particles); wherein said particles further comprise: (a) modified starch having a dextrose equivalent from 15 to 20 and said sugar alcohol polyol and said modified starch are present at a weight ratio of said sugar alcohol polyol to said modified starch from 2:1 to 16:1, or from 2:1 to 10:1, or from 2:1 to 3:1; or (b) modified starch having a dextrose equivalent from 4 to less than 15 and said sugar alcohol polyol and said modified starch are present at a weight ratio of said sugar alcohol polyol to said modified starch from 1.5:1 to 16:1, or from 1.5:1 to 10:1, or from 1.5:1 to 4. The modified starch can have a dextrose equivalent from 15 to 20 and said sugar alcohol polyol and said modified starch can be present at a ratio from 2:1 to 16:1, or from 2:1 to 10:1, or from 2:1 to 3:1. The modified starch can have a dextrose equivalent from 4 to less than 15 and said sugar alcohol polyol and said modified starch can be present at a weight ratio of said sugar alcohol polyol to said modified starch from 1.5:1 to 16:1, or from 1.5:1 to 10:1, or from 1.5:1 to 4:1. The modified starch can have a dextrose equivalent from 4 to 12. The modified starch can be maltodextrin. The sugar alcohol polyol can be mannitol. The plasticizer polyol can be selected from the group consisting of glycerin, dipropylene glycol, propylene glycol, and mixtures thereof.

The particles can comprise more than about 20% by weight water soluble carrier. The particles can comprise more than about 40% by weight water soluble carrier. The particles can comprise from about 20% to about 99% by weight water soluble carrier. Optionally, the particles can comprise from about 35% to about 85%, or even from about 50% to about 80%, by weight of the particles water soluble carrier. The water soluble carrier can be selected from the group consisting of a polyalkylene polymer of formula $H-(C_2H_4O)_x-(CH(CH_3)CH_2O)_y-(C_2H_4O)_z-OH$ wherein x is from 50 to 300, y is from 20 to 100, and z is from 10 to 200; a polyethylene glycol fatty acid ester of formula $(C_2H_4O)_q-C(O)O-(CH_2)_r-CH_3$ wherein q is from 20 to 200 and r is from 10 to 30; a polyethylene glycol fatty alcohol ether of formula $HO-(C_2H_4O)_s-(CH_2)_t-CH_3$ wherein s is from 30 to 250 and t is from 10 to 30; C8-C22 alkyl polyalkoxylate comprising more than 40 alkoxylate units; polyethylene glycol having a weight average molecular weight from 2000 to 15000; EO/PO/EO block copolymer; PO/EO/PO block copolymer; EO/PO block copolymer; PO/EO block copolymer; polypropylene glycol; ethoxylated nonionic surfactant having a degree of ethoxylation greater than 30; polyvinyl alcohol; polyalkylene glycol having a weight average molecular weight from 2000 to 15000; and mixtures thereof.

Fabric Care Benefit Active Agent

The particles can comprise about 0.1% to about 99% by weight fabric care benefit active agent. A fabric care benefit active agent is a substance provided as part of the composition of particles in a sufficient quantity to impart a benefit to the fabric being treated with the particles.

The fabric care benefit active agent can be selected from the group consisting of an amine, a surfactant system, nonionic surfactant, a water-binding agent, a sulfite, fatty acids and/or salts thereof, enzymes, encapsulated benefit agents, soil release polymers, hueing agents, builders, chelating agents, dye transfer inhibiting agents, dispersants, enzyme stabilizers, catalytic materials, bleaching agents, bleach catalysts, bleach activators, polymeric dispersing agents, cyclodextrin complexed benefit agents, soil removal/anti-redeposition agents, encapsulated perfumes, polymeric dispersing agents, polymeric grease cleaning agents, brighteners, suds suppressors, dyes, hueing agents, free perfume, structure elasticizing agents, fabric softening agents, quaternary amines, hard and soft tallow, carriers, fillers, hydrotropes, organic solvents, anti-microbial agents and/or preservatives, neutralizers and/or pH adjusting agents, processing aids, fillers, antioxidants, rheology modifiers or structurants, opacifiers, pearlescent agents, pigments, anti-corrosion and/or anti-tarnishing agents, and mixtures thereof.

Perfume

The fabric care benefit agent can be perfume. A perfume is an oil or fragrance that includes one or more odoriferous compounds, for example synthetic products of the ester, ether, aldehyde, ketone, alcohol, and hydrocarbon type. Mixtures of various odoriferous substances, which together produce an attractive fragrant note, can be used. Such perfume oils can also comprise natural mixtures of odoriferous compounds, as are available from vegetal sources.

Perfume can be a substantially water insoluble composition comprising perfume components, optionally mixed with a suitable solvent or diluent. Suitable solvents or diluents include compounds selected from the group consisting of ethanol, isopropanol, diethylene glycol monoethyl ether, dipropylene glycol, diethyl phthalate, triethyl citrate, and mixtures thereof.

The perfume can be provided as unencapsulated perfume. The perfume can be provided in a perfume delivery system. Zeolite and cyclodextrine are examples of perfume delivery systems. The perfume can be encapsulated in starch. For example an emulsion of starch and perfume oil can be spray dried to form particles of starch having droplets of perfume dispersed within the starch matrix. Perfume delivery systems can be particulate materials or fine particulate materials that may be difficult to handle in a manufacturing environment due to the possibility that the particles may become suspended in air.

The perfume can be encapsulated perfume. Encapsulated perfume is commonly employed in laundry products. Encapsulated perfume comprises a plurality of droplets of liquid perfume each of which are encapsulated in an encapsulate shell. Perfume may be encapsulated in a water soluble or water insoluble encapsulate shell. Encapsulate shell can comprise melamine-urea-formaldehyde, melamine formaldehyde, urea formaldehyde, starch, and the like materials. The encapsulate shell wall can be a material selected from polyethylenes; polyamides;

polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts; and mixtures thereof. When the encapsulate shell comprises an aminoplast, the aminoplast may comprise polyurea, polyurethane, and/or polyureaurethane. The polyurea may comprise polyoxymethyleneurea and/or melamine formaldehyde. Encapsulates having an encapsulate shell comprising a polysaccharide can be practical. The encapsulate shell can be selected from the group consisting of chitosan, gum arabic, alginate, β-glucan, starch, starch derivatives, plant proteins, gelatin, alyssum homolocarpum seed gum, and combinations thereof.

The encapsulate shell can comprise from about 90% to 100%, optionally from about 95% to 100%, optionally from about 99% to 100% by weight of the shell of an inorganic material. The inorganic material can be selected from the group consisting of metal oxide, semi-metal oxides, metals, minerals, and mixtures thereof, optionally selected from the group consisting of $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper, and mixtures thereof, optionally selected from the group consisting of $SiO_2$, $TiO_2$, $Al_2O_3$, $CaCO_3$, and mixtures thereof, optionally $SiO_2$. The encapsulate shell can comprise a first shell component comprising a condensed layer and a nanoparticle layer, wherein the condensed layer comprises a condensation product of a precursor, and wherein the nanoparticle layer comprises inorganic nanoparticles, and wherein the condensed layer is disposed between the core and the nanoparticle layer, and a second shell component surrounding the first shell component, wherein the second shell component surrounds the nanoparticle layer. The encapsulate can be any of those encapsulates described in United States Patent Publications 2020/0330948 A1, 2020/0330949 A1, and 2020/0330950 A1 and United States Patent Application 63/092,829.

The perfume can comprise one or more fragrances of plant origin. A fragrance of plant origin is a concentrated hydrophobic liquid containing volatile chemical compound extracted from a plant. The fragrance of plant origin can be selected from the group consisting of allspice berry, angelica seed, anise seed, basil, bay laurel, bay, bergamot, blood orange, camphor, caraway seed, cardamom seed, carrot seed, cassia, catnip, cedarwood, celery seed, chamomile german, chamomile roman, cinnamon bark, cinnamon leaf, citronella, clary sage, clove bud, coriander seed, cypress, elemi, eucalyptus, fennel, fir needle, frankincense, geranium, ginger, grapefruit pink, helichrysum, hop, hyssop, juniper berry, labdanum, lavender, lemon, lemongrass, lime, magnolia, mandarin, marjoram, melissa, mugwort, myrrh, myrtle, neroli, niaouli, nutmeg, orange sweet, oregano, palmarosa, patchouli, pennyroyal, pepper black, peppermint, petitgrain, pine needle, radiata, ravensara, rose, rosemary, rosewood, sage, sandalwood, spearmint, spikenard, spruce, star anise, sweet annie, tangerine, tea tree, thyme red, verbena, vetiver, wintergreen, wormwood, yarrow, ylang ylang extra, and ylang ylang III, and mixtures thereof.

The particles can comprise from about 0.1% to about 20% by weight of the particles perfume, optionally from about 0.1% to about 15%, optionally from about 0.1% to about 12%, optionally from about 1% to about 15%, optionally from about 2% to about 20%, optionally from about 8% to about 10% by weight of the particles perfume.

Perfume Emulsion Composition

The fabric care benefit agent can be a perfume emulsion composition. The perfume emulsion composition can comprise an aminofunctional silicone, wherein the aminofunctional silicone comprises one or more primary amine moieties, and wherein the aminofunctional silicone is characterized by a total amine content of from about 0.05 to about 2.2; one or more emulsifiers; one or more perfume raw materials, wherein the one or more perfume raw materials comprises an aldehyde moiety, a ketone moiety, or combinations thereof; and water.

The perfume emulsion composition can be any of those described in European Patent Office Application 20156010.9, filed Feb. 7, 2020.

The aminofunctional silicone can be characterized by:
(a) a total amine content of from about 0.071 to about 2.14, or from about 0.071 to about 1.78, or from about 0.71 to about 1.43, or from about 0.14 to about 1.07, or from about to about 0.71, or from about 0.21 to about 0.71, or from about 0.36 to about 0.71; and/or
(b) a primary amine content of from about 0.05 to about 2.2, preferably from about 0.071 to about 2.14, or from about 0.071 to about 1.78, or from about 0.71 to about 1.43, or from about 0.14 to about 1.07, or from about 0.14 to about 0.71, or from about 0.21 to about 0.71, or from about 0.36 to about 0.71; and/or
(c) a ratio of primary amine content to total amine content of from about 1:2 to about 1:1, preferably from about 1.2:2, more preferably from about 1.5:2, or even more preferably from about 1.8:2.

The aminofunctional silicone can be characterized by the following formula:

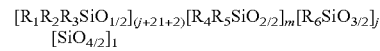

wherein
j is an integer from 0 to 150, preferably from 0 to 50, more preferably from 0 to 20;
m is an integer from 10 to 1500, preferably 10 to 1000, more preferably from 20 to 500;
l is an integer from 0 to 150, preferably from 1 to 150, more preferably from 0 to 50, most preferably from 0 to 20;
with the proviso j+m+l equals an integer greater than or equal to 50; each of $R_1$, $R_2$, $R_3$, $R_4$, $R_5$ and $R_6$ moieties is independently selected from the group consisting of H, OH, $C_1$-$C_{32}$ alkyl, $C_1$-$C_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl, $C_1$-$C_{32}$ alkoxy and $C_1$-$C_{32}$ substituted alkoxy, and X—Z, wherein at least one of the moieties $R_1$ through $R_6$=X—Z, preferably wherein each $R_{1-6}$ is independently selected from the group consisting of OH, $C_1$-$C_2$ alkyl, $C_1$-$C_2$ substituted alkyl, $C_1$-$C_2$ alkoxy, $C_1$-$C_2$ substituted alkoxy, and X—Z;

wherein each X is independently a substituted or unsubstituted divalent alkylene or alkylidene radical comprising 2-12 carbon atoms, preferably each X is independently a substituted or unsubstituted divalent alkylene or alkylidene radical comprising 2-6 carbon atoms, most preferably each X is independently a substituted or unsubstituted divalent alkylene or alkylidene radical comprising 2-4 carbon atoms;

wherein each Z is a moiety comprising the one or more primary amine moieties, preferably wherein each Z is independently selected from the group —$NH_2$, —N(H)—X—$NH_2$, or a mixture thereof.

The emulsion composition can be characterized by at least one of characteristics (a) through (d):

(a) comprising from about 10% to about 70%, or from about 25% to about 65%, or from about 50% to about 65%, by weight of the silicone emulsion, of the aminofunctional silicone; and/or (b) comprising from about 30% to about 90%, or from about 35% to about 75%, or from about 35% to about 50%, by weight of the emulsion, of water; and/or (c) being characterized by a viscosity of from about 10 to about 500 Pa·s, preferably from about 20 to about 400 Pa·s, more preferably from about 25 to about 300 Pa·s, even more preferably from about 100 to about 300 Pa·s, measured at 0.1 rad/s and 25° C.; and/or (d) comprising a plurality of droplets, where the plurality of droplets is characterized by a mean diameter of from about 1 micron to about 5 microns.

The one or more perfume raw materials can comprise a material selected from the following:

a. oncidal, methyl nonyl acetaldehyde, adoxal, melanal, calypsone, or mixtures thereof;

b. cuminic aldehyde, benzaldehyde, anisic aldehyde, heliotropin, isocyclocitral, triplal/ligustral, 3,6-ivy carbaldehyde, ligustral, scentenal, or mixtures thereof;

c. satinaldehyde (jasmorange), otropal, cyclamen homoaldehyde, cyclamen aldehyde (cyclamal), lilial, canthoxal, floralozone, cinnemic aldehyde, or mixtures thereof;

d. delta-damascone, beta-damascone, alpha-damascone, nectaryl, or mixtures thereof;

e. vanillin, ethyl vanillin, or mixtures thereof; or f. a combination of materials selected from at least two categories of a, b, c, d, and e.

The one or more emulsifiers can comprise a nonionic surfactant, preferably wherein the nonionic surfactant comprises an alkoxylated fatty alcohol, even more preferably wherein the one or more emulsifier is characterized by an HLB value of from about 5 to about 20, preferably from about 8 to about 16.

The one or more emulsifiers can comprise a first emulsifier and a second emulsifier, wherein the second emulsifier is different from the first emulsifier, preferably wherein the first emulsifier is a linear nonionic surfactant, and/or preferably wherein the second emulsifier is a branched nonionic surfactant.

Fabric Softening

The fabric care active benefit agent can be a fabric softening active. The particles can comprise from about 5% to about 45% by weight quaternary ammonium compound. The quaternary ammonium compound can be an ester quaternary ammonium compound. The quaternary ammonium compound can be those described in United States Patent Publications 2019/0169538 A1, 2019/0169539 A1, 2019/0169777 A1, 2019/0169532 A1, 2019/0169533 A1, and 2019/0169534 A1. The quaternary ammonium compound can be di-(tallowoyloxyethl)-N,N-methylhydroxyethylammonium methyl sulfate.

The fabric softening active can be a fatty amine. The particles can comprise from about 8% to 45% by weight fatty amine. The fatty amine can be those described in United States Patent Publication 2020/0354652 A1.

The fabric softening active can be a silicone. The particles can comprise from about 1% to about 50% by weight silicone. The silicone can be that as described in United States Patent Publication 2017/0349865.

Branched Polyester

The fabric care active benefit agent can be a branched polyester. The particles can comprise from about 5% to about 45% by weight a branched polyester. The branched polyester can be those described in United States Patent Publication 2019/0367841 A1. The branched polyester can be those described and claimed in United States Patent Publication 2019/0233764 A1.

Cationic Polymer

The fabric care active benefit agent can be a cationic polymer. The particles can comprise from about 0.1% to about 10% by weight cationic polymer. The cationic polymer can be selected from the group consisting of cationic polysaccharide, Polyquaternium-4, Polyquaternium-6, Polyquaternium-7, Polyquaternium-10, Polyquaternium-22, Polyquaternium-67, and mixtures thereof. The cationic polysaccharide can be polymeric quaternary ammonium salt of hydroxyethylcellulose which has been reacted with an epoxide substituted with a trimethylammonium group.

Enzyme

The fabric care active benefit agent can be enzyme. The particles can comprise from about 0.0001% to about 5% by weight an enzyme. The enzyme can be selected from the group consisting of protease, xyloglucanase, mannanase, and combinations thereof. The enzyme can be those described in United States Patent Publications 2017/0260481 A1 and 2017/0260482 A1.

Graft Copolymer

The fabric care active benefit agent can be a graft copolymer. The particles can comprise from about 1% to about 75% by weight a graft copolymer. The graft copolymer can those described in United States Patent Application 69/951,274. The graft copolymer can those described in United States Patent Application 69/722,492.

Antioxidant

The fabric care active benefit agent can be an antioxidant. The particles can comprise from about 0.2% to about 2% by weight antioxidant. The antioxidant can be dispersed in a matrix of said water soluble carrier. The antioxidant can those described in United States Patent Application 63/034,766. The antioxidant can be butylated hydroxytoluene.

Apparatus and Process for Forming Particles

An apparatus 1 for forming particles is shown in FIG. 1. The precursor material 20 can be a melt of any of the compositions disclosed herein for the particles 90. The precursor material 20 can comprise more than about 20% by weight water soluble carrier. The precursor material 20 can comprise more than about 20% by weight water soluble polymer. The precursor material 20 can comprise from about 20% to about 99% by weight water soluble carrier. The precursor material 20 can comprise from about 20% to about 99% by weight water soluble polymer. The precursor material 20 can comprises more than about 20%, optionally more than about 40%, by weight polyethylene glycol having a weight average molecular weight from about 2000 to about 13000 and from about 0.1% to about 20% by weight perfume.

The raw material or raw materials can be provided to a batch mixer 10. The batch mixer can have sufficient capacity to retain the volume of raw materials provided thereto for a sufficient residence time to permit the desired level of mixing and or reaction of the raw materials. The material leaving the batch mixer 10 can be the precursor material 20. Optionally, the precursor material can be provided to the feed pipe 40 from some other upstream mixing process, for example in-line mixing, in-line static mixing, and the like. The precursor material 20 can be a molten product. The batch mixer 10 can be a dynamic mixer. A dynamic mixer is a mixer to which energy is applied to mix the contents in the mixer. The batch mixer 10 can comprise one or more impellers to mix the contents in the batch mixer 10.

Between the batch mixer 10, which is optionally present, and the distributor 30, the precursor material 20 can be transported through the feed pipe 40. The feed pipe 40 can be in fluid communication with the batch mixer 10. One or more gas feed lines 155 can be provided in fluid communication with the feed pipe 40 downstream of the batch mixer 10. One or more gas feed lines 155 can be provided in fluid communication with the feed pipe 40 between the batch mixer 10 and the distributor 30. A mill 200 can be provided downstream of the one or more gas feed lines 155 and in line with the feed pipe 40. The mill 200 can be provided in line with the feed pipe 40 downstream of the one or more gas feed lines 155 and upstream of the distributor 30.

The precursor material 20 can be provided to the feed pipe 40. The feed pipe 40 is the conveyance by which the precursor material 20 is carried. The feed pipe 40 includes the conveyance between elements of the apparatus 1 and the conveyance through which the precursor material is carried within components of the apparatus 1. For instance, the mill 200 may be provided in a unit with a portion of the conveyance approaching the mill 200 and a portion of the conveyance exiting the mill 200. Each of these portions is part of the feed pipe 40. So, the feed pipe 40 can be viewed the entire conveyance between the batch mixer 10 and the distributor 30 and the feed pipe 40 is interrupted by various elements such as the one or more gas feed lines 155, the mill 200, intermediate mixer 50, and feed pump 140. In absence of a batch mixer 10 upstream of the feed pipe 40, the feed pipe 40 can be viewed the entire conveyance upstream of the distributor 30 and the feed pipe 40 is interrupted by various elements such as the one or more gas feed lines 155, the mill 200, intermediate mixer 50, and feed pump 140.

An intermediate mixer 55 can be provided downstream of the mill 200 and in line with feed pipe 40. The intermediate mixer 55 can be a static mixer 50. The intermediate mixer 55 can be in fluid communication with the feed pipe 40 between the mill 200 and the distributor 30. The intermediate mixer 55, which can be a static mixer 50, can be downstream of the batch mixer 10. Stated otherwise, the batch mixer 10 can be upstream of the intermediate mixer 55 or static mixer 55 if employed. The intermediate mixer 55 can be in-line with the feed pipe 40. The intermediate mixer 55 can be a rotor-stator mixer. The intermediate mixer 55 can be a colloid mill. The intermediate mixer 55 can be a driven in-line fluid disperser. The intermediate mixer 55 can be an Ultra Turrax disperser, Dispax-reactor disperser, Colloid Mil MK, or Cone Mill MKO, available from IKA, Wilmington, North Carolina, United States of America. The intermediate mixer 55 can be a perforated disc mill, toothed colloid mill, or DIL Inline Homogenizer, available from FrymaKoruma, Rheinfelden, Switzerland. The static mixer 50 can be a helical static mixer. The static mixer 50 can be a Kenics 1.905 cm inside diameter KMS 6, available from Chemineer, Dayton, OH, USA.

Without being bound by theory, it is believed that an intermediate mixer 55, such as the static mixer 50, can provide for a more uniform temperature of the precursor material 20 within the distributor 30 or stator 100. At the downstream end of the intermediate mixer 55, or static mixer 50 if used, the temperature of the precursor material 20 within the feed pipe 40 across a cross section of the feed pipe 40 orthogonal to the direction of flow can vary by less than about 10° C., or less than about 5° C., or less than about 1° C., or less than about 0.5° C.

In absence of a static mixer 50, the temperature across a cross section of the feed pipe 40 orthogonal to the direction of flow may be non-uniform. The temperature of the precursor material 20 at the center line of the feed pipe 40 may be higher than the temperature of the precursor feed material 20 at the peripheral wall of the feed pipe 40. When the precursor material 20 is discharged to the distributor 30 or stator 100, the temperature of the precursor material 20 may vary at different positions within the distributor or stator 100. Without being bound by theory, it is thought that by providing for a uniform temperature across the cross section of the feed pipe 40 by employing a static mixer 50 as described herein, more uniform particles 90 can be produced as compared to an apparatus 1 that does not have a static mixer 50.

The distributor 30 can be provided with a plurality of apertures 60. The precursor material 20 can be passed through the apertures 60. After passing through the apertures 60, the precursor material 20 can be deposited on a moving conveyor 80 that is provided beneath the distributor 30. The precursor material 20 can be deposited on the moving conveyor 80 when the conveyor 80 is in motion. The conveyor 80 can be moveable in translation relative to the distributor 30. The conveyor 80 can be a continuously moving conveyor 80. The conveyor 80 can be an intermittently moving conveyor 80. A continuously moving conveyor 80 may provide for higher processing speeds. An intermittently moving conveyor 80 can provide for improved control of the shape of the particles 90 that are produced.

The precursor material 20 can be cooled on the moving conveyor 80 to form a plurality of solid particles 90. The cooling can be provided by ambient cooling. Optionally the cooling can be provided by spraying the under-side of the conveyor 80 with ambient temperature water or chilled water.

Once the particles 90 are sufficiently coherent, the particles 90 can be transferred from the conveyor 80 to processing equipment downstream of the conveyor 80 for further processing and or packaging.

Figure 2:
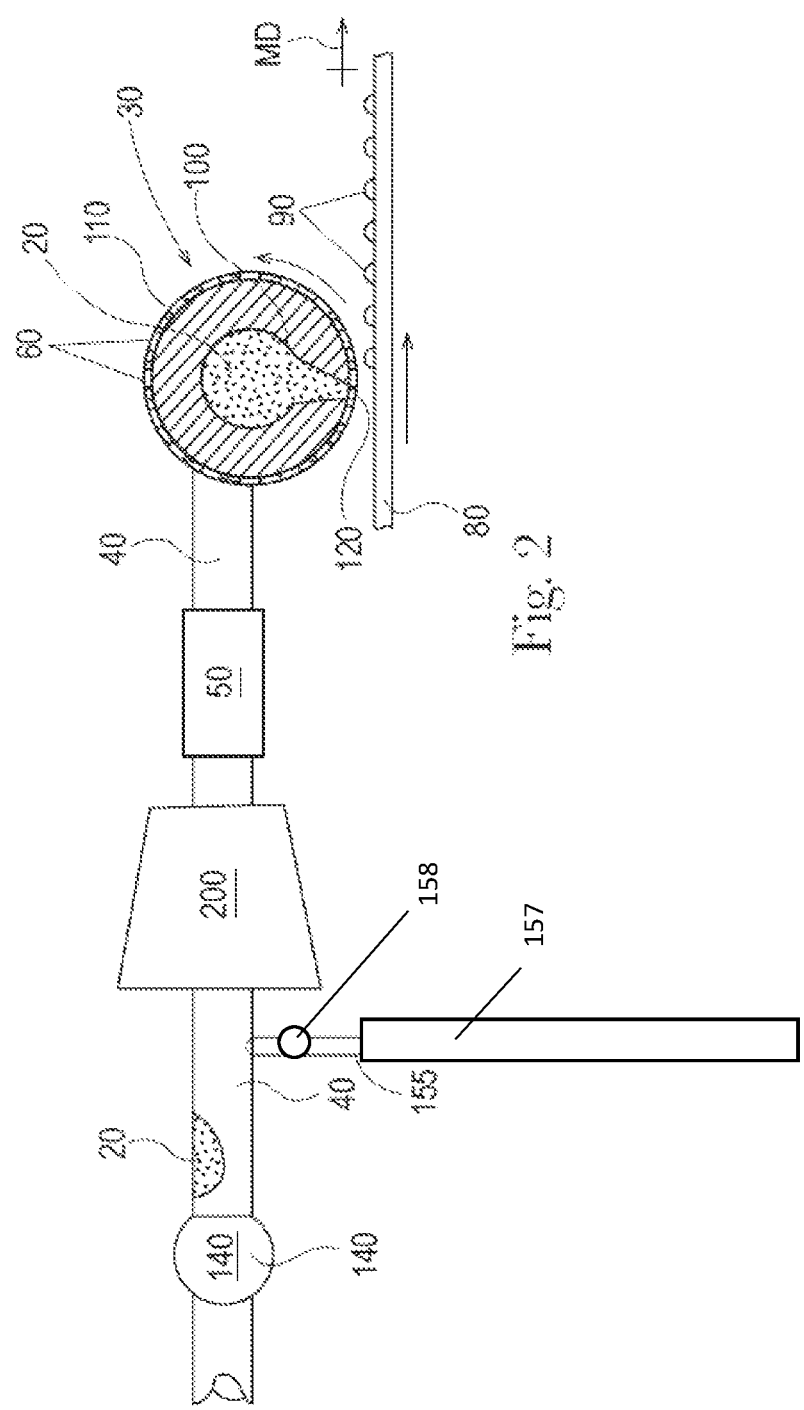
FIG. 2 is a portion of an apparatus for forming particles.

The distributor 30 can be a cylinder 110 rotationally mounted about a stator 100 with the stator being in fluid communication with the feed pipe 40 and the cylinder 110 can have a periphery 120 and there can be a plurality of apertures 60 in the periphery 120, as shown in FIG. 2. So, the apparatus 1 can comprise a stator 100 in fluid communication with the feed pipe 40. The feed pipe 40 can feed the precursor material 20 to the stator 100 after the precursor material has passed through the mill 200.

The apparatus 1 can comprise a cylinder 110 rotationally mounted about the stator 100. The stator 100 is fed precursor material through one or both ends 130 of the cylinder 110. The cylinder 110 can have a longitudinal axis L passing through the cylinder 110 about which the cylinder 110 rotates. The cylinder 110 has a periphery 120. There can be a plurality of apertures in the periphery 120 of the cylinder 110.

As the cylinder 110 is driven to rotate about its longitudinal axis L, the apertures 60 can be intermittently in fluid communication with the stator 100 as the cylinder 110 rotates about the stator 100. The cylinder 110 can be considered to have a machine direction MD in a direction of movement of the periphery 120 across the stator 100 and a cross machine direction on the periphery 120 orthogonal to the machine direction MD. The stator 100 can similarly be considered to have a cross machine direction CD parallel to the longitudinal axis L. The cross machine direction of the stator 100 can be aligned with the cross machine direction of the cylinder 110. The stator 100 can have a plurality of distribution ports 122 arranged in a cross machine direction CD of the stator 100. The distribution ports 122 are portions or zones of the stator 100 supplied with precursor material 20.

In general, precursor material 20 can be fed past the one or more gas feed lines 155 through the mill 200 and feed pipe 40 to the stator 100. The stator 100 distributes the precursor feed material 20 across the operating width of the cylinder 110. As the cylinder 110 rotates about its longitudinal axis, precursor material 20 is fed through the apertures 60 as the apertures 60 pass by the stator 100. A discrete mass of precursor material 20 is fed through each aperture 60 as each aperture 60 encounters the stator 100. The mass of precursor material 20 fed through each aperture 60 as each aperture 60 passes by the stator 100 can be controlled by controlling one or both of the pressure of the precursor material within the stator 100 and the rotational velocity of the cylinder 110 or optionally controlling the viscosity of the precursor material 20 by controlling the temperature of the precursor material 20.

Drops of the precursor material 20 are deposited on the conveyor 80 across the operating width of the cylinder 110. The conveyor 80 can be moveable in translation relative to the longitudinal axis of the cylinder 110. The velocity of the conveyor 80 can be set relative to the tangential velocity of the cylinder 110 to control the shape that the precursor material 20 has once it is deposited on the conveyor 80. The velocity of the conveyor 80 can be the about the same as the tangential velocity of the cylinder 110.

As shown in FIG. 1, flow of the precursor material 20 through the feed pipe 40 can be provided by gravity driven flow from a batch mixer 10 and the distributor 30. To provide for more controllable manufacturing, the apparatus 1 can be provided with a feed pump 140, as shown in FIG. 2. The feed pump 140 can be in line with the feed pipe 40, with in line meaning in the line of flow of the precursor material 20. The feed pump 140 can between the batch mixer 10 and the distributor 30. The feed pump 140 can be upstream of the distributor 30. If a stator 100 is employed, the feed pump 140 can be in line with the feed pipe 40, with in line meaning in the line of flow of the precursor material 20. If a stator 100 is employed, the feed pump 140 can be between the batch mixer 10 and the stator 100. The feed pump 140 can be upstream of the stator 100. In describing the position of the feed pump 140, between is used to describe the feed pump 140 being in-line downstream of the batch mixer 10 and upstream of the distributor 30 or if used, upstream of the stator 100.

The one or more gas feed lines 155 and the mill 200 can be positioned in line between the feed pump 140 and the distributor 30 or stator 100, if employed in the apparatus 1.

The flow rate of the precursor material 20 can be about 3 L/min. The precursor material can be a molten material comprising any of the compositions described herein for the precursor material 20 or particles 90.

The apparatus 1 can comprise one or more gas feed lines 155. A single gas feed line 155 can be practical if the gas to entrained into the precursor material can be practically supplied via a single gas feed line 155. As described herein, a gas of a single constituent or a gas comprising multiple constituents can be desirable. A single constituent gas or multi-constituent gas can be provided in a single container 157. For example, a mixture of argon, carbon dioxide, and nitrogen can be provided in a gas cylinder. Optionally, mixtures of gasses can be provide continuously from the environment via a reaction process or by combining air with another gas sourced from a container. The gas can be pressurized via a compressor.

The one or more gas feed lines 155 can comprise a flow regulator 158. The flow regulator 158 can regulate the flow of gas into the feed line 40. The volume of gas added per unit volume of precursor material 20 can be controlled by setting the flow regulator 158 to the desired flow rate. The more gas fed into the precursor material 20 within the feed line 40, the more gas that will be contained in the particles 90. The one or more gas feed lines 155 can provide for entraining gas into the precursor material 20.

The flow regulator 158 can be Key Instruments Flo-Rite Series GS 65 mm flowmeter, part number 60410-R5. The feed line 40 can be a 1½' stainless steel sanitary pipe. The gas feed line 155 can be 1¼' inside diameter polyethylene tubing. Gas can be provided in the gas feed line 155 at a pressure greater than about 4 bar, for example 5.9 bar.

If two or more gas feed lines 155 are separately connected to the feed pipe 40, a flow regulator can be provided along each gas feed line 155 to regulate the flow of gas in each respective gas feed line 155. If a mixture of gas is introduced into the feed pipe 40 via a single gas feed line 155, a single flow regulator 158 can be practical.

At the connection between a gas feed line 155 and the feed pipe an injection quill device for introducing the gas can be provided.

The gas can be provided at a temperature and pressure such that when the gas reaches ambient temperature and pressure the desired volume of gas is present in the particles 90. The Ideal Gas Law can be used to determine the desired temperature and pressure of delivery. The gas can also comprise water. The water can be in gaseous or liquid form. The quantity of water in the gas can be selected to be at the desired level.

The mill 200 can be a rotor-stator type mill. The mill can be a Quadro Z1 in-line mixer with a single stage of medium rotor stators, operated at about 400 RPM.

The mill 200 and the one or more gas feed lines 155 can be combined in a single unit.

An Oakes Foamer (E.T. Oakes Corporation, 686 Old Willets Path, Hauppauge, NY 11788) 2MT1A continuous foamer) can be used to provide a gas feed line 155, flow regulator 158 and mill 200 in a single unit.

Figure 3:
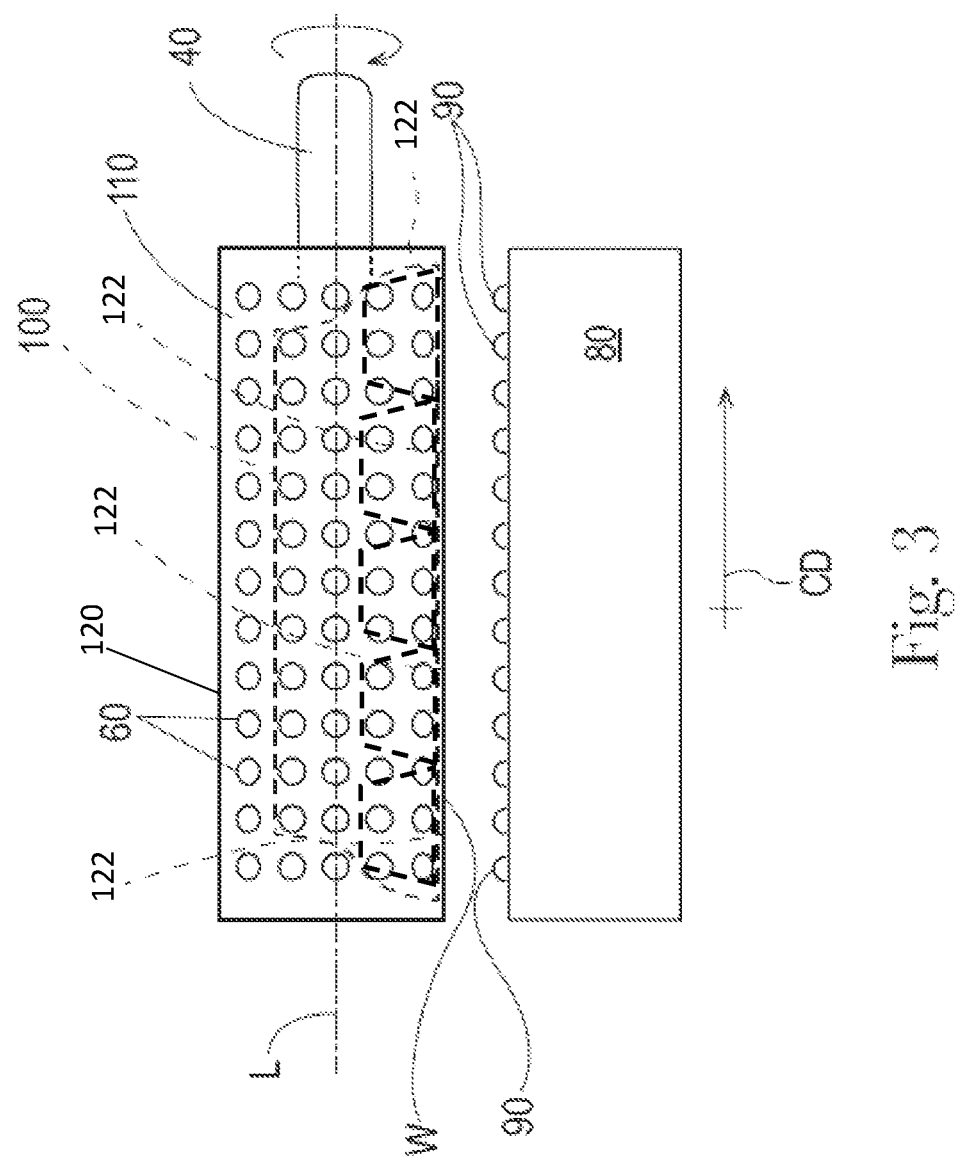
FIG. 3 is an end view of an apparatus for forming particles.

A view of an apparatus 1 in the machine direction MD is shown in FIG. 3. As shown in FIG. 3, the apparatus 1 can have an operating width W and the cylinder 110 can rotate about longitudinal axis L.

The apparatus 1 for forming particles 90 can comprise: a feed pipe; one or more gas feed lines 155 mounted in fluid communication with the feed pipe 40 downstream of the batch mixer 10; a mill 200 downstream of the one or more gas feed lines 155 and in line with the feed pipe and a distributor 30 downstream of the mill 200 and fluid communication with said feed pipe wherein said distributor 30 comprises a plurality of apertures 60. The apparatus 1 can comprise a conveyor beneath the distributor 30 and movable in translation relative to the distributor 30. The distributor 30 can comprise a stator 100 in fluid communication with the feed pipe 40. The distributor 30 can comprise a cylinder 110 rotationally mounted about the stator 100 and rotatable about a longitudinal axis L of the cylinder 110. The cylinder 110 can have a periphery 120 and the cylinder 110 can have a plurality of apertures 60 disposed about the periphery 120. The apertures 60 can be intermittently in fluid communication with the stator 100 as the cylinder 110 rotates about the stator 100. The apparatus can comprise a conveyor 80 beneath the cylinder 110 and the conveyor 80 can be movable in translation relative to the longitudinal axis L. The apparatus 1 for forming particles 90 can comprise a batch mixer 10. The feed pipe 40 can be in fluid communication with the batch mixer 10.

The process for forming particles 90 can comprise the steps of: providing a precursor material 20 to a feed pipe 40; entraining gas into the precursor material 20, wherein the gas comprises from about 50 vol % to about 100 vol %, optionally from about 55 vol % to about 100 vol %, optionally from about 60 vol % to about 100 vol %, optionally from about 70 vol % to about 100 vol %, optionally from about 80 vol % to about 100 vol %, optionally from about 90 vol % to about 100 vol %, optionally 100 vol %, argon; providing a distributor 30 having a plurality of apertures 60; transporting the precursor material 20 from the feed pipe 40 to the distributor 30; passing the precursor material 20 through the apertures 60; providing a movable conveyor 80 beneath the apertures 60; depositing the precursor material 20 on to the movable conveyor 80; and cooling the precursor material 20 to form a plurality of particles 90.

The gas can be entrained in the precursor material 20 as a mixture of gasses. For example the mixture of gasses can directed into the precursor material 20 via a single gas feed line 155. The mixture of gasses can comprise from about 50 vol % to about 100 vol %, optionally from about 55 vol % to about 100 vol %, optionally from about 60 vol % to about 100 vol %, optionally from about 70 vol % to about 100 vol %, optionally from about 80 vol % to about 100 vol %, optionally from about 90 vol % to about 100 vol %, optionally 100 vol %, argon and from about 0 vol % to about 50 vol % other constituents. The mixture can be provided from a container 157 containing the mixture of gasses. For example, the container 157 can be a gas cylinder that is filled with the desired gas, which is a mixture of different gasses.

Figure 4:
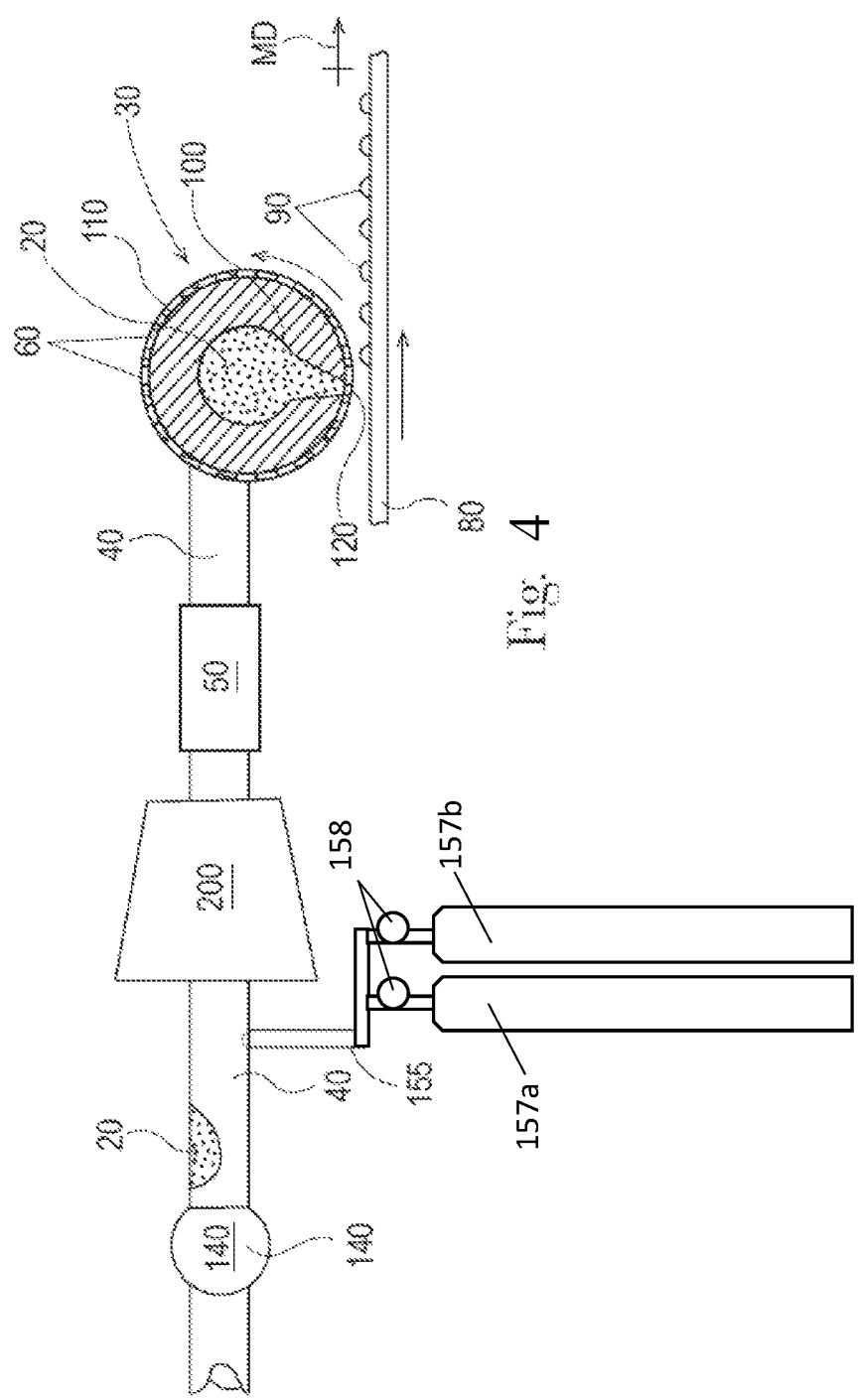
FIG. 4 is a portion of an apparatus for forming particles.

Optionally, the argon can be provided from a primary container 157a and the other constituents of the gas can be provided from one or more secondary containers 157b (FIG. 4). The primary container 157a and secondary container 157b can feed into a single gas feed line 155. Flow regulators 158 can control the flow of gas from the primary container 157a and secondary container 157b into the gas feed line 155. Optionally, an inline mixer can be provided in or upstream of the gas feed line 155 to mix the gasses from the primary container 157a and the secondary container 157b.

The primary container 157a can contain the argon. The other constituents of the gas can be provided from the secondary container 157b. The other constituents of the gas can be provided as air or carbon dioxide from the secondary container 157b. Containers of air and containers of carbon dioxide are readily available commercially. Similarly containers of argon are readily available commercially. The operator of the apparatus 1 can acquire a cylinder of argon and a cylinder of air and set the flow regulators 158 to provide the desired gas. The argon and the other constituents of the gas can be combined into a single flow of the gas prior to being entrained into the precursor material 20.

Optionally, the primary container 157a can feed into a primary gas feed line 155 and the secondary container 157b can feed into a secondary gas feed line 155. Gas flow within each gas feed line 155 can be regulated by a flow regulator 158 dedicated to such gas feed line 155.

In operation, it can be practical to provide the precursor material 20 in the feed pipe at an operating pressure from about 2 bars to about 8 bars. The gas can be fed into the feed pipe at pressure above the operating pressure of the feed pipe 40. The gas, or the argon constituent thereof, can be entrained at a pressure greater than about 3 to about 4 bars, or even greater than about 4 bars, or even greater than about 5 bars.

The solubility of argon in the precursor material 20 can be greater than the solubility of the majority by volume of other constituents of the gas. When argon gas is fed into the stream of precursor material 20 that is at the operating pressure, the argon solubilizes into the precursor material 20. Other constituents of the gas may or may not solubilize into the precursor material at the operating pressure. Those constituents that have a low solubility in the precursor material 20 relative to the argon predominantly remain as bubbles in the precursor material 20.

As the precursor material 20 passes through the apertures 60, the pressure drops towards or to atmospheric pressure. The precursor material 20 may also begin to cool. The precursor material 20 may continue to cool as the precursor material 20 travels from the apertures 60 to the movable conveyor 80. Cooling continues after the precursor material 20 is deposited on the movable conveyor 80. Heat is removed from the precursor material 20 by the conveyor and the belt facing side of the precursor material 20 in contact with the movable conveyor 80 begins to solidify. Similarly the surface of the precursor material 20 continues to cool after the precursor material 20 is deposited on the movable conveyor 80. As such, cooling of the precursor material once deposited on the movable conveyor 80 is three dimensional time dependent process.

As the molten precursor material 20 cools, a solidification front develops from the belt facing side of precursor material 20 and the solidification front advances away from the moveable conveyor 80 over time. The air facing side of the precursor material 20, which is away from the belt facing surface of the precursor material, also cools as a function of time. This results in a solidification front advancing from the air facing surface towards the center of the particle being formed on the moveable conveyor 80 as the precursor material 20 cools.

If the gas entrained in the precursor material 20 is air, which is about 78 vol % nitrogen, about 21 vol % oxygen, about 0.93 vol % argon, and about 0.03 vol % carbon dioxide, most of that gas has limited solubility into the precursor material 20 and the air remains as bubbles in the precursor material 20 throughout the process of making particles. This can limit the amount of air that can be entrained in the precursor material 20 and still make particles having the desired stability and appearance. After the precursor material 20 is deposited on the moveable belt 40, the buoyancy of the air bubbles in the precursor material 20 and the solidification front advancing from the belt facing side of the precursor material 20 tends to drive some of the air bubbles away from the movable conveyor 80. As the air bubbles are driven upwardly, they may coalesce to form larger air bubbles. Some of the air bubbles may escape through the air facing side of the precursor material 20. Escaped air bubbles no longer contribute to the porosity of the particles 90. If a skin layer has formed on the air facing side of the precursor material 20, air bubbles may erupt through the skin layer which can result in particles 90 that have a physically unstable outer surface. A physically unstable outer surface is undesirable as that can result in the particles being subject to flaking and make the particles messy to use.

The problem with using air as the gas to be entrained is that the air bubbles exist in the precursor material 20 when the precursor material 20 is deposited onto the moveable belt 40 and the phenomena described in the preceding paragraph occur, which can result in unsatisfactory particles 90. Surprisingly, using a gas that comprises from about 50 vol % to about 100 vol %, optionally from about 55 vol % to about 100 vol %, optionally from about 60 vol % to about 100 vol %, optionally from about 70 vol % to about 100 vol %, optionally from about 80 vol % to about 100 vol %, optionally from about 90 vol % to about 100 vol %, optionally 100 vol %, argon can improve the ability of the precursor material 20 to retain bubbles as the precursor material 20 cools on the movable conveyor 80 to form particles 90. That can result in particles 90 that have a higher porosity and fewer large bubbles at or near the air facing surface of the particles 90.

Argon can be relatively soluble in the precursor material 20 as compared to other gas constituents. The gas constituents that are relatively insoluble in the precursor material 20 may be present as bubbles. When the operating pressure on the precursor material is released to or towards ambient pressure, the argon comes out of solution. The process of the argon coming out of solution from the precursor material 20 is a time dependent process. The bubbles of gas constituents that are relatively insoluble in the precursor material 20, if present, may serve as nucleation sites for the argon to come out of solution from the precursor material. While the argon is coming out of solution, the precursor material 20 is also cooling. As described previously, a solidification front may develop from the belt facing side of the precursor material and the air facing side of the precursor material 20 is also solidifying. The solidifying or solidified precursor material 20 forms a barrier to bubbles escaping from the precursor material 20. As the argon gradually comes out of solution from the precursor material 20, bubbles of argon may form and or the argon may come out of solution into the existing bubbles of relatively insoluble gas constituents. The delayed formation of the argon bubbles or the expansion of the existing bubbles of relatively insoluble gas constituents as the argon nucleates on such bubbles allows for a greater volume of bubbles to be formed in the precursor material 20. And these late formed bubbles are less likely to escape from the precursor material 20. Once the precursor material 20 has completely solidified, the formed particle 90 can have a large volume of voids.

Gas that comprises from about 50 vol % to about 100 vol %, optionally from about 55 vol % to about 100 vol %, optionally from about 60 vol % to about 100 vol %, optionally from about 70 vol % to about 100 vol %, optionally from about 80 vol % to about 100 vol %, optionally from about 90 vol % to about 100 vol %, optionally 100 vol %, argon can be advantageous over air or gas that is more than about 50 vol % carbon dioxide. For dissolved gases to contribute to void volume of the solidified particle 90, the bubbles come out of solution and form bubbles in a time dependent process. For bubble formation caused by the change in gas solubility as a function of change in pressure, or decompression nucleation, the rate of bubble formation decreases with the solubility. The rate of bubble formation from decompression nucleation using argon that is partially soluble in the precursor material 20 can be much faster than the rate of bubble formation when using a relatively more soluble gas such as carbon dioxide. Such can be the case when the precursor material 20 comprises more than about 20% by weight water soluble polymer, or more particularly, polyethylene glycol having a weight average molecular weight from about 2000 to about 13000.

If the rate of bubble formation from decompression nucleation is slower than the rate of solidification, the phase change will drive bubble formation. Bubble formation in the solidifying precursor material 20 driven by phase change can cause the surface of the particle to rupture and cause expanding melt to solidify on the surface of the particle. This is an undesirable aesthetic for particles 90 and can also lead to the accumulation of broken particles 90 in the product package, which is also undesirable. For particles formed by distributor 30 that maintains the molten precursor material 20 under pressure essentially until the molten precursor material is discharged from the distributor 30, an acceptable gas can be one providing for partial solubility in the molten precursor material 20 at atmospheric pressure and has a time-dependent nucleation rate upon deposition of the precursor material 20 that is faster than the solidification rate of the precursor material 20 that ultimately forms the particle 90. For a polyethylene glycol carrier having a weight average molecular weight from about 2000 to about 13000 with a pressure change of a minimum 3 bar through a distributor 30, argon can provide these desired properties. Argon can be advantageous over a blend of air and carbon dioxide due to its partial solubility in a water soluble polymer such as polyethylene glycol. At the same temperature and pressure, argon is much more soluble than air into polyethylene glycol, since the nitrogen fraction of air has relatively low solubility in polyethylene glycol compared to argon. However, compared to carbon dioxide, argon has a much lower solubility, as the amount of injected carbon dioxide is nearly completely dissolved at only 3 bar line pressure and the same amount of argon is only partially dissolved at 10 bar. The gas can be entrained at a pressure from about 3 bar to about 10 bar.

Particles

The particles 90 can be formed as described herein can comprise about 25% to about 99% by weight water soluble carrier. The particles 90 can further comprise from about 0.1% to about 20% by weight fabric care benefit active agent. Each of the particles can have a mass from about mg to about 200 mg, preferably from about 10 mg to about 100 mg, preferably from about 20 mg to about 50 mg. The particles can have a hemispherical or compressed hemispherical shape.

The fabric care benefit active agent can be selected from the group consisting of an amine, a surfactant system, nonionic surfactant, a water-binding agent, a sulfite, fatty acids and/or salts thereof, enzymes, encapsulated benefit agents, soil release polymers, hueing agents, builders, chelating agents, dye transfer inhibiting agents, dispersants, enzyme stabilizers, catalytic materials, bleaching agents, bleach catalysts, bleach activators, polymeric dispersing agents, cyclodextrin complexed benefit agents, soil removal/anti-redeposition agents, encapsulated perfumes, polymeric dispersing agents, polymeric grease cleaning agents, brighteners, suds suppressors, dyes, hueing agents, free perfume, structure elasticizing agents, fabric softening agents, quaternary amines, hard and soft tallow, carriers, fillers, hydrotropes, organic solvents, anti-microbial agents and/or preservatives, neutralizers and/or pH adjusting agents, processing aids, fillers, antioxidants, rheology modifiers or structurants, opacifiers, pearlescent agents, pigments, anti-corrosion and/or anti-tarnishing agents, and mixtures thereof.

The fabric care benefit active agent can be selected from the group consisting of an antimicrobial, antioxidant, perfume, fabric conditioning agent, dye, dye fixative, and combinations thereof. The fabric care benefit active agent can be unencapsulated perfume or encapsulated perfume.

Each of the particles 90 can have a mass from about 5 mg to about 200 mg, optionally about 10 mg to about 100 mg, optionally from about 20 mg to about 50 mg. The particles can have a hemispherical or compressed hemispherical shape.

Particles 90 can be produced as follows. A 50 kg batch of precursor material 20 can be prepared in a mixer. Molten PEG8000 can be added to a jacketed mixer held at 70° C. and agitated with a pitch blade agitator at 125 rpm. Butylated hydroxytoluene can be added to the mixer at a level of about 0.01% by weight of the precursor material 20. A water based slurry of perfume microcapsules can be added to the mixer at a level of about 4% by weight of the precursor material 20. Unencapsulated perfume can be added to the mixer at a level of about 8% by weight of the precursor material 20. Dye can be added to the mixer at a level of about 0.01% by weight of the precursor material 20. The PEG can account for the balance by weight of the precursor material 20. The precursor material 20 can be mixed for 30 minutes.

The precursor material 20 can be formed into particles 90 on a SANDVIK ROTOFORM 3000 having a 750 mm wide 10 m long belt. The cylinder 110 can have 2 mm diameter apertures set at a 10 mm pitch in the cross machine direction CD and 9.35 mm pitch in the machine direction MD. The cylinder can be set at approximately 3 mm above the belt. The belt speed and rotational speed of the cylinder 110 can be set at 10 m/min.

After mixing the precursor material 20, the precursor material 20 can be pumped at a constant 3.1 kg/min rate, or even a 4 kg/min rate, from the mixer 10 through a plate and frame heat exchanger set to control the outlet temperature to 50° C. The pressure in the feed pipe 40 downstream of the pump 140 can be about 2 to about 7 bar, and alternatively about 5.5 bar or about 5 bar, the pressure being in the feed pipe 40 downstream of the mill 200.

The gas can be entrained in the precursor material 20 at a volumetric flow rate ratio of precursor material to gas from about 1.3:1 to about 2.6:1, or even about 1.3:1 to about 1.6:1. The pressure of the gas in the gas feed line 155 must be higher than the pressure in the feed pipe 40 to ensure flow and entrainment of gas into the precursor material 20. The flow rate for the precursor material 20 can be about 4.5 liters per minute, and the gas flow rate may be about 3.4 liters per minute. The gas can be argon, a mixture of argon and carbon dioxide, or a mixture of argon and other relatively insoluble gases.

The precursor material 20 having the gas entrained therein can be passed through a Quadro Z1 mill with medium rotor/stator elements. After milling, the precursor material can optionally be passed through a Kenics 1.905 cm KMS 6 static mixer 50 installed 91.44 cm upstream of the stator 100 of the rotoforming device.

Combinations:
- A. A process for forming particles comprising the steps of:
  - a. providing a precursor material (20) to a feed pipe (40);
  - b. entraining gas into said precursor material, wherein said gas comprises from about vol % to about 100 vol %, optionally about 55 vol % to about 100 vol %, optionally about 60 vol % to about 100 vol %, optionally about 70 vol % to about 100 vol %, optionally about 80 vol % to about 100 vol %, optionally about 90 vol % to about 100 vol %, optionally about 100 vol %, argon and from about 0 vol % to about 50 vol % other constituents;
  - c. providing a distributor (30) comprising a plurality of apertures (60);
  - d. transporting said precursor material (20) from said feed pipe to said distributor;
  - e. passing said precursor material through said apertures;
  - f. providing a moveable conveyor (80) beneath said apertures;
  - g. depositing said precursor material onto said moveable conveyor; and
  - h. cooling said precursor material to form a plurality of particles (90).
- B. The process according to Paragraph A, wherein said distributor comprises:
  - a. a stator (100) in fluid communication with said feed pipe;
  - b. a cylinder (110) rotationally mounted about said stator and rotatable about a longitudinal axis (L) of said cylinder, wherein said cylinder has a periphery (120) and said cylinder comprises said plurality of apertures disposed about said periphery, wherein said apertures are intermittently in fluid communication with said stator as said cylinder rotates about said stator.
- C. The process according to Paragraph A or B, further comprising the step of milling said precursor material after the step of entraining gas into said precursor material.
- D. The process according to Paragraph C, wherein said step of milling said precursor material after the step of entraining gas into said precursor material is performed with an in-line rotor-stator mill.
- E. The process according to any of Paragraphs A to D, wherein said gas is entrained as a mixture of gasses.
- F. The process according to Paragraph E, wherein said mixture of gasses is from a container containing a mixture of said gas.

G. The process according to any of Paragraphs A to E, wherein said argon is provided from a primary container (157a) and said other constituents of said gas are provided from one or more secondary containers (157b).

H. The process according to Paragraph G, wherein said argon and said other constituents of said gas are combined into a single flow of said gas prior to being entrained into said precursor material.

I. The process according to Paragraph H wherein said other constituents of said gas are provided as air from said secondary container.

J. The process according to any of Paragraphs A to I, wherein said argon is entrained at a pressure greater than 2 bars at a minimum flow rate of about 0.5 liters/min.

K. The process according to any of Paragraphs A to J, wherein more than 50 vol % of said other constituents are less soluble in said precursor material than said argon.

L. The process according to any of Paragraphs A to K, wherein said precursor material comprises more than about 20% by weight water soluble polymer.

M. The process according to Paragraph L, wherein said water soluble polymer is selected from the group consisting of:
   a. a polyalkylene polymer of formula H—$(C_2H_4O)_x$—$(CH(CH_3)CH_2O)_y$—$(C_2H_4O)_z$—OH wherein x is from 50 to 300, y is from 20 to 100, and z is from 10 to 200;
   b. a polyethylene glycol fatty acid ester of formula $(C_2H_4O)_q$—C(O)O—$(CH_2)_r$—$CH_3$ wherein q is from 20 to 200 and r is from 10 to 30;
   c. a polyethylene glycol fatty alcohol ether of formula HO—$(C_2H_4O)_s$—$(CH_2)_t$—$CH_3$ wherein s is from 30 to 250 and t is from 10 to 30;
   d. C8-C22 alkyl polyalkoxylate comprising more than 40 alkoxylate units;
   e. polyethylene glycol having a weight average molecular weight from 2000 to 15000;
   f. EO/PO/EO block copolymer;
   g. PO/EO/PO block copolymer;
   h. EO/PO block copolymer;
   i. PO/EO block copolymer;
   j. polypropylene glycol;
   k. ethoxylated nonionic surfactant having a degree of ethoxylation greater than 30;
   l. polyvinyl alcohol;
   m. polyalkylene glycol having a weight average molecular weight from 2000 to 15000; and mixtures thereof.

N. The process according to any of Paragraphs A to M, wherein said precursor material comprises polyethylene glycol having a weight average molecular weight from about 2000 to about 13000.

The process according to any of Paragraphs A to N, wherein said precursor material comprises more than about 40% by weight polyethylene glycol.

P. The process according to any of Paragraphs A to O, wherein said particles have an individual mass between about 0.1 mg to about 2 g.

Q. The process according to any of Paragraphs A to P, wherein said precursor material comprises from about 0.1% to about 20% by weight perfume.

R. The process according to Paragraph Q, wherein said perfume comprises encapsulated perfume.

S. The process according to Paragraph Q, wherein said perfume comprises encapsulated perfume and unencapsulated perfume.

T. The process according to any of Paragraphs A to S, wherein said precursor material comprises between about 0.1% and about 20% by weight encapsulated perfume.

U. The process according to any of Paragraphs A to T, wherein the step of cooling said precursor material is conducted by way of ambient cooling.

V. The process according to any of Paragraphs A to U, wherein said precursor material is provided to said feed pipe from a batch mixer (10).

W. The process according to any of Paragraphs A to V, wherein said other constituents are selected from the group consisting of oxygen, nitrogen, argon, and mixtures thereof.

X. The process according to any of Paragraphs A to W, wherein said precursor material comprises a fabric care benefit agent selected from the group consisting of an amine, a surfactant system, nonionic surfactant, a water-binding agent, a sulfite, fatty acids and/or salts thereof, enzymes, encapsulated benefit agents, soil release polymers, hueing agents, builders, chelating agents, dye transfer inhibiting agents, dispersants, enzyme stabilizers, catalytic materials, bleaching agents, bleach catalysts, bleach activators, polymeric dispersing agents, cyclodextrin complexed benefit agents, soil removal/anti-redeposition agents, encapsulated perfumes, polymeric dispersing agents, polymeric grease cleaning agents, brighteners, suds suppressors, dyes, hueing agents, free perfume, structure elasticizing agents, fabric softening agents, quaternary amines, hard and soft tallow, carriers, fillers, hydrotropes, organic solvents, anti-microbial agents and/or preservatives, neutralizers and/or pH adjusting agents, processing aids, fillers, antioxidants, rheology modifiers or structurants, opacifiers, pearlescent agents, pigments, anti-corrosion and/or anti-tarnishing agents, and mixtures thereof.

Y. The process according to any of Paragraphs A to X, wherein said gas is argon.

Z. The process according to any of Paragraphs A to Y, wherein said gas is entrained at a pressure from about 3 bar to about 10 bar.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for forming particles comprising the steps of:
providing a precursor material (20) to a feed pipe (40);
entraining gas into said precursor material, wherein said gas comprises from about 50 vol % to about 100 vol % argon and from about 0 vol % to about 50 vol % other constituents;
providing a distributor (30) comprising a plurality of apertures (60);
transporting said precursor material (20) from said feed pipe to said distributor;
passing said precursor material through said apertures;
providing a moveable conveyor (80) beneath said apertures;
depositing said precursor material onto said moveable conveyor; and
cooling said precursor material to form a plurality of particles (90).

2. The process according to claim 1, wherein said distributor comprises:
a stator (100) in fluid communication with said feed pipe;
a cylinder (110) rotationally mounted about said stator and rotatable about a longitudinal axis (L) of said cylinder, wherein said cylinder has a periphery (120) and said cylinder comprises said plurality of apertures disposed about said periphery, wherein said apertures are intermittently in fluid communication with said stator as said cylinder rotates about said stator.

3. The process according to claim 2, further comprising the step of milling said precursor material after the step of entraining gas into said precursor material.

4. The process according to claim 3, wherein said step of milling said precursor material after the step of entraining gas into said precursor material is performed with an in-line rotor-stator mill.

5. The process according to claim 1, wherein said gas is entrained as a mixture of gasses.

6. The process according to claim 5, wherein said mixture of gasses is from a container containing a mixture of said gas.

7. The process according to claim 1, wherein said argon is provided from a primary container (157a) and said other constituents of said gas are provided from one or more secondary containers (157b).

8. The process according to claim 7, wherein said argon and said other constituents of said gas are combined into a single flow of said gas prior to being entrained into said precursor material.

9. The process according to claim 8 wherein said other constituents of said gas are provided as air from said secondary container.

10. The process according to claim 1, wherein said argon is entrained at a pressure greater than 2 bars at a minimum flow rate of about 0.5 liters/min.

11. The process according to claim 1, wherein more than 50 vol % of said other constituents are less soluble in said precursor material than said argon.

12. The process according to claim 1, wherein said precursor material comprises more than about 20% by weight water soluble polymer.

13. The process according to claim 12, wherein said water soluble polymer is selected from:
a polyalkylene polymer of formula $H-(C_2H_4O)-(CH(CH_3)CH_2O)_y-(C_2H_4O)_z-OH$ wherein x is from 50 to 300, y is from 20 to 100, and z is from 10 to 200;
a polyethylene glycol fatty acid ester of formula $(C_2H_4O)_q-C(O)O-(CH_2)_r-CH_3$ wherein q is from 20 to 200 and r is from 10 to 30;
a polyethylene glycol fatty alcohol ether of formula $HO-(C_2H_4O)_s-(CH_2)_t-CH_3$ wherein s is from 30 to 250 and t is from 10 to 30;
C8-C22 alkyl polyalkoxylate comprising more than 40 alkoxylate units;
polyethylene glycol having a weight average molecular weight from 2000 to 15000;
EO/PO/EO block copolymer;
PO/EO/PO block copolymer;
EO/PO block copolymer;
PO/EO block copolymer;
polypropylene glycol;
ethoxylated nonionic surfactant having a degree of ethoxylation greater than 30;
polyvinyl alcohol;
polyalkylene glycol having a weight average molecular weight from 2000 to 15000; and
mixtures thereof.

14. The process according to claim 1, wherein said precursor material comprises polyethylene glycol having a weight average molecular weight from about 2000 to about 13000.

15. The process according to claim 1, wherein said precursor material comprises more than about 40% by weight polyethylene glycol.

16. The process according to claim 1, wherein said particles have an individual mass between about 0.1 mg to about 2 g.

17. The process according to claim 1, wherein said precursor material comprises from about 0.1% to about 20% by weight perfume.

18. The process according to claim 1, wherein the step of cooling said precursor material is conducted by way of ambient cooling.

19. The process according to claim 1, wherein said precursor material is provided to said feed pipe from a batch mixer (10).

20. The process according to claim 1, wherein said other constituents are selected from of oxygen, nitrogen, carbon dioxide, and mixtures thereof.

* * * * *